United States Patent
Tang

(10) Patent No.: US 6,261,064 B1
(45) Date of Patent: Jul. 17, 2001

(54) COMBINATION OF CEILING FAN BRACKET AND MOTOR CASING

(76) Inventor: David Tang, No. 3, Nong 5, Lane 66, Yang Ming St., Feng Yuan City, Taichung Hsien (TW)

( * ) Notice: Subject to any disclaimer, the term of this patent is extended or adjusted under 35 U.S.C. 154(b) by 0 days.

(21) Appl. No.: 09/429,311

(22) Filed: Oct. 28, 1999

(51) Int. Cl.[7] .................................................. F04D 29/34
(52) U.S. Cl. ..................... 416/210 R; 416/5; 416/204 R; 416/205; 416/206; 416/220 A; 416/221; 403/315; 403/329; 403/363; 403/375
(58) Field of Search ................................ 416/5, 205, 206, 416/207, 210 R, 214 R, 220 A, 221, 204 R; 403/295, 315, 316, 329, 363, 335, 375

(56) References Cited

U.S. PATENT DOCUMENTS

| | | | |
|---|---|---|---|
| B1 5,951,197 | * 9/1999 | Wu | 403/315 |
| B1 5,954,449 | * 9/1999 | Wu | 403/315 |
| B1 5,980,353 | * 11/1999 | Wu | 416/210 R |
| B1 6,059,531 | * 5/2000 | Tai | 416/220 A |
| B1 6,149,388 | * 11/2000 | Liao | 416/210 R |

* cited by examiner

Primary Examiner—Christopher Verdier
(74) Attorney, Agent, or Firm—Charles E. Baxley

(57) ABSTRACT

A ceiling fan bracket has a first end connected to a ceiling fan blade and a second end of the ceiling fan bracket has two L-shaped wings. A connector is connected to the second end of the ceiling fan bracket and has two tongues. A motor casing has a plurality of L-shaped holes and each L-shaped hole includes a wide portion located close to a center of the motor casing and a narrow portion located close to a periphery of the motor casing. Each wing is engaged with the narrow portion of the L-shaped hole and each tongue is engaged with the wide portion of the L-shaped hole. The eccentric force applied to the ceiling fan bracket secures the ceiling fan bracket to the L-shaped hole in the motor casing.

7 Claims, 6 Drawing Sheets

COMBINATION OF CEILING FAN BRACKET AND MOTOR CASING

FIELD OF THE INVENTION

The present invention relates to an engagement of a ceiling fan bracket and a motor casing. The motor casing has a plurality of L-shaped holes and the ceiling fan bracket has an end connected to a connector which is securely engaged with a narrow portion of the L-shaped hole, wherein the narrow portion is located toward the direction of the eccentric force when the ceiling fan is rotated.

BACKGROUND OF THE INVENTION

FIG. 1 shows a conventional engagement of the motor casing 12 and a conventional ceiling fan bracket 11. The ceiling fan bracket 11 has a first end with a frame 110 for connection with the ceiling fan blade (not shown), and a second end of the ceiling fan bracket 11 has a plate 111 which has two holes defined therethrough. The motor casing 12 has a plurality of apertures 120 so that the plate 111 is firmly connected to the motor casing 12 by extending bolts 10 through aligned holes in the plate 111 and the apertures 120 in the motor casing 12. However, when the ceiling fan rotates, the bolts 10 tend to be loosened and noise generates due to the loosened bolts 10. Besides, to engage the bolts 10 one by one takes a lot of time.

The present invention intends to provide a combination of ceiling fan bracket and a motor casing, wherein the ceiling fan bracket has two wings and the motor casing has a plurality of L-shaped holes so that the two wings are securely engaged with a narrow portion of the L-shaped holes. The eccentric force applied to the ceiling fan bracket makes the ceiling fan bracket be engaged with the hole securely.

SUMMARY OF THE INVENTION

In accordance with one aspect of the present invention, there is provided a combination of a ceiling fan bracket and a motor casing, wherein the ceiling fan racket has an end with two L-shaped wings respectively extending therefrom and a connector is connected to the end of the ceiling fan bracket. The connector has two tongues extending therefrom.

The motor casing has a plurality of L-shaped holes defined therethrough and each L-shaped hole includes a wide portion located close to a center of the motor casing and a narrow portion located close to a periphery of the motor casing. Each wing is engaged with the narrow portion of the L-shaped hole and each tongue of the connector is engaged with the wide portion of the L-shaped hole.

The object of the present invention is to provide an engagement of a ceiling fan bracket and a motor casing, the ceiling fan bracket being secured to the L-shaped hole in the motor casing when the eccentric force is applied to the ceiling fan bracket.

Another object of the present invention is to provide a ceiling fan bracket which is engaged with the motor casing quickly and easily.

These and further objects, features and advantages of the present invention will become more obvious from the following description when taken in connection with the accompanying drawings which show, for purposes of illustration only, several embodiments in accordance with the present invention.

DETAILED DESCRIPTION OF THE PREFERRED EMBODIMENTS

Figure 1:
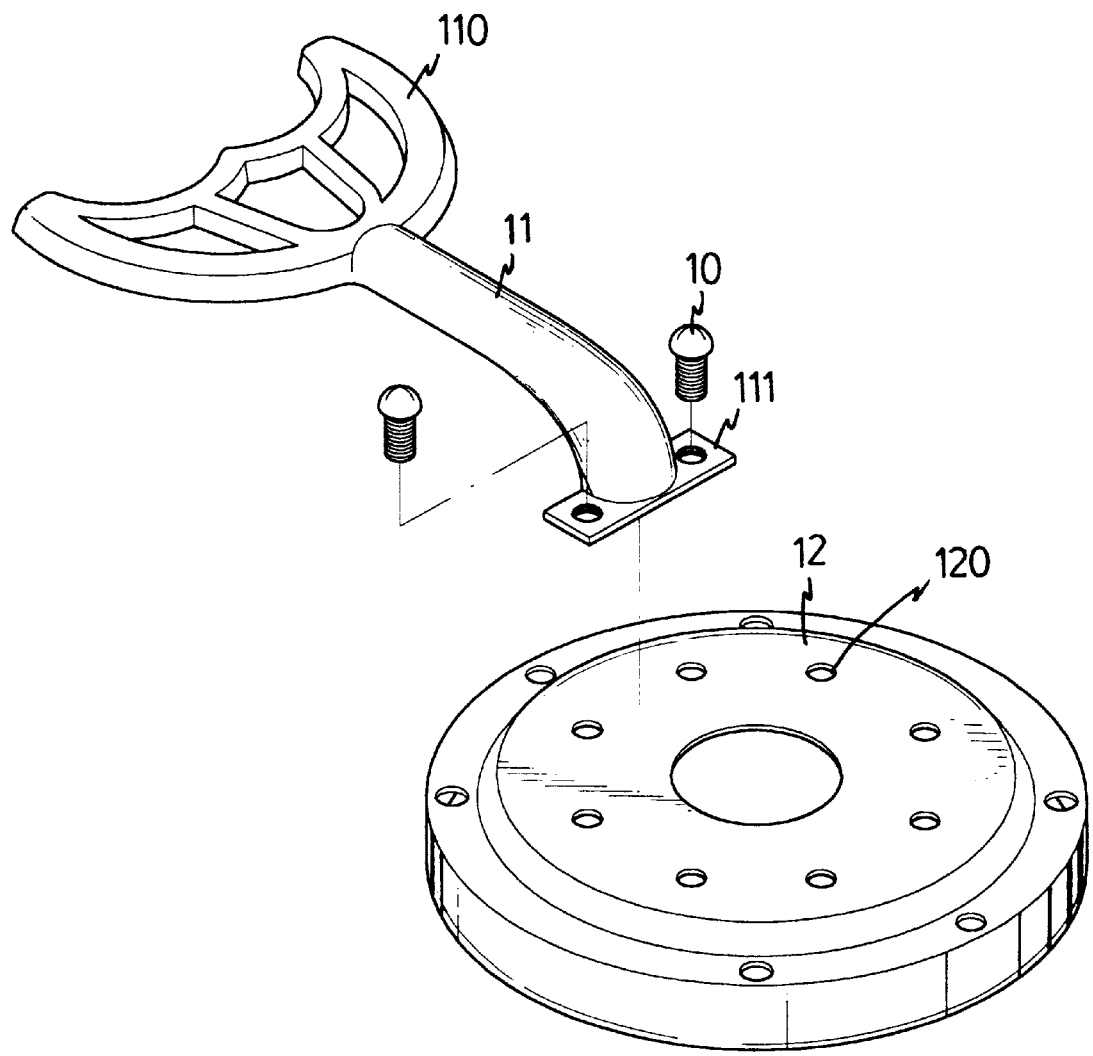
FIG. 1 is an exploded view to show a conventional ceiling fan bracket and a conventional motor casing.
Figure 2:
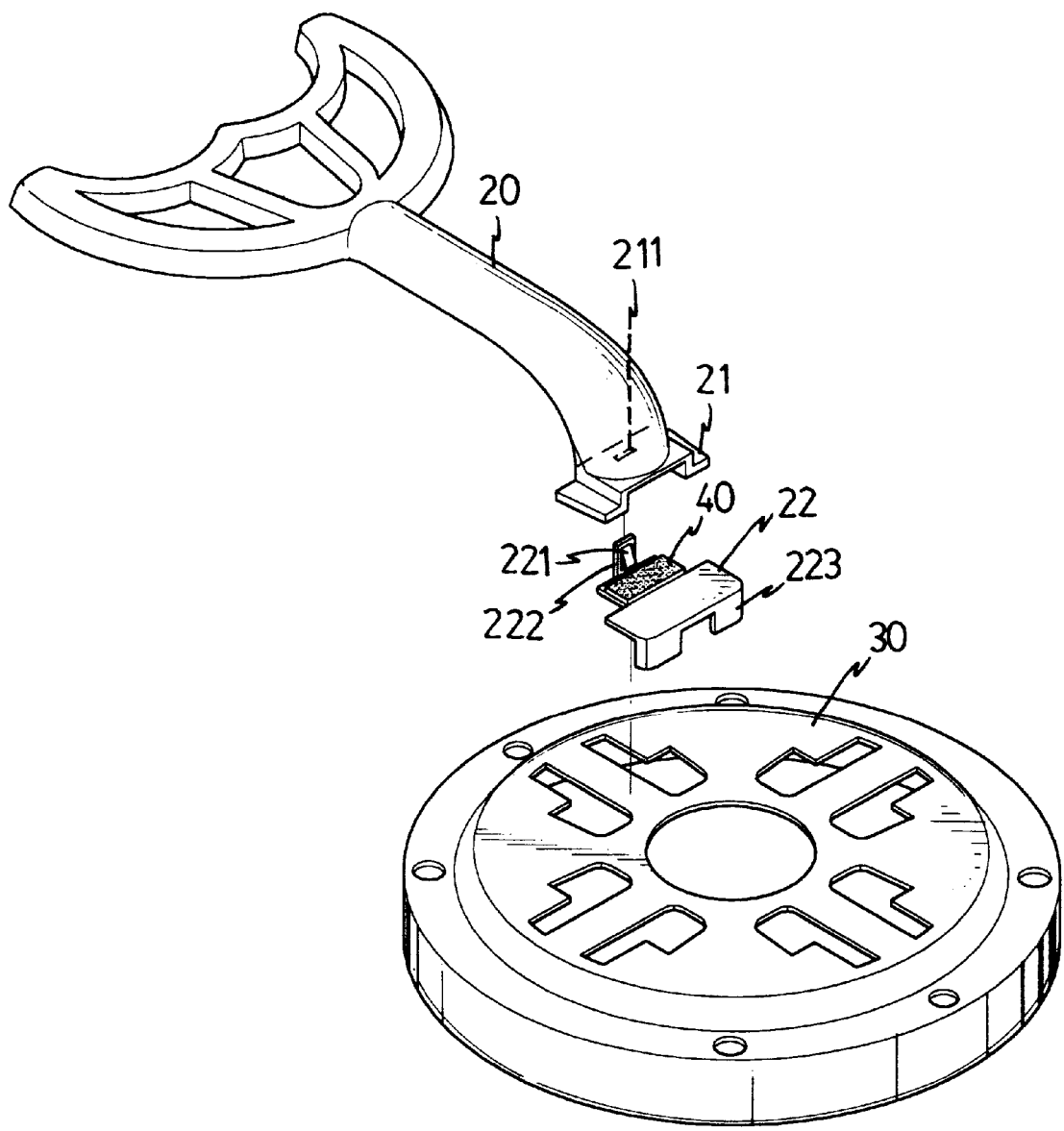
FIG. 2 is an exploded view to show a ceiling fan bracket and a motor casing in accordance with the present invention.
Figure 3:
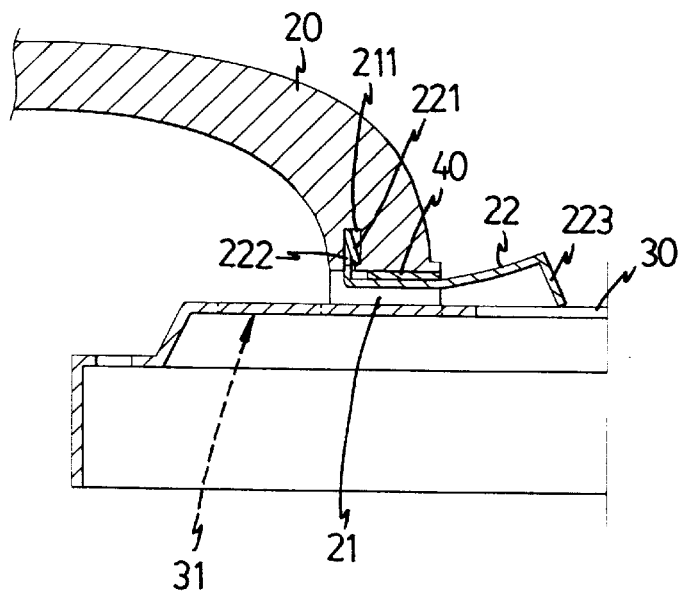
FIG. 3 is a cross-sectional view to show the first step of installing the ceiling fan bracket with a connector to the motor casing, wherein the two tongues contact against the motor casing and the connector is slightly deformed.
Figure 4:
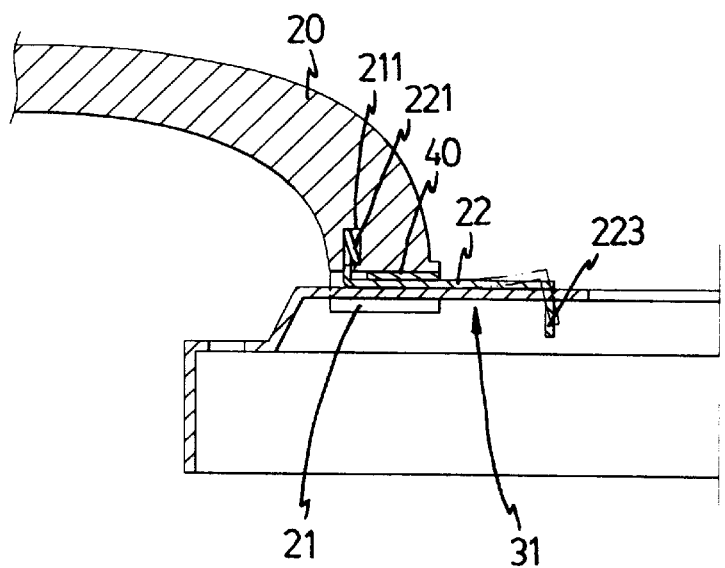
FIG. 4 is a cross-sectional view to show the second step of installing the ceiling fan bracket to the motor casing, wherein the two wings of the ceiling fan bracket are pulled away from the center of the motor casing and the two tongues are engaged with the wide portion of the L-shaped holes in the motor casing.

Referring to FIGS. 2 to 4, the ceiling fan bracket 20 in accordance with the present invention comprises a first end to be connected to a ceiling fan blade (not shown), and a second end of the ceiling fan bracket 20 has two L-shaped wings 21 respectively extending from two sides of a shank portion of the ceiling fan bracket 20. The second end of the ceiling fan bracket 20 has an aperture 211 defined therein.

A connector 22 is connected to the second end of the ceiling fan bracket 20 and two tongues 223 extend perpendicularly from a first end of the connector 22. A protrusion 222 extends perpendicularly from a second end of the connector 22 in an opposite direction with reference to the direction that the two tongues 223 extend. A flexible hook member 221 extends laterally from a side of the protrusion 222 so that the connector 22 is connected to the second end of the ceiling fan bracket 20 by inserting the protrusion 222 into the aperture 211, and the hook member 221 is engaged with the aperture 211 when the hook member 221 passes through the aperture 211. A cushion pad 40 is adhered on the connector 22 between the first end and the second end of the connector 22. The cushion pad 40 prevents from trembling between the ceiling fan bracket 20 and the connector 22 so as to reduce possible noise.

A motor casing 30 has a plurality of L-shaped holes 31 defined therethrough. Each L-shaped hole 31 includes a wide portion located close to a center of the motor casing 30 and a narrow portion located close to a periphery of the motor casing 30. When engaging the ceiling fan bracket 20 to the motor casing 30, the two wings 21 pass through the two wide portions of the two adjacent L-shaped holes 31 and the two tongues 223 contact against the motor casing 30. The connector 22 is slightly deformed as shown in FIG. 3. As shown in FIG. 4, the ceiling fan bracket 20 is pulled toward the narrow portions of the L-shaped holes 31, and the two wings 21 are engaged with the motor casing 30 at the narrow portions and the two tongues 223 are moved to be engaged with the wide portions of the two L-shaped holes 31. When the ceiling fan rotates, the eccentric force will securely push the second end of the ceiling fan bracket 20 toward the narrow portions of the L-shaped holes 31.

Figure 5:
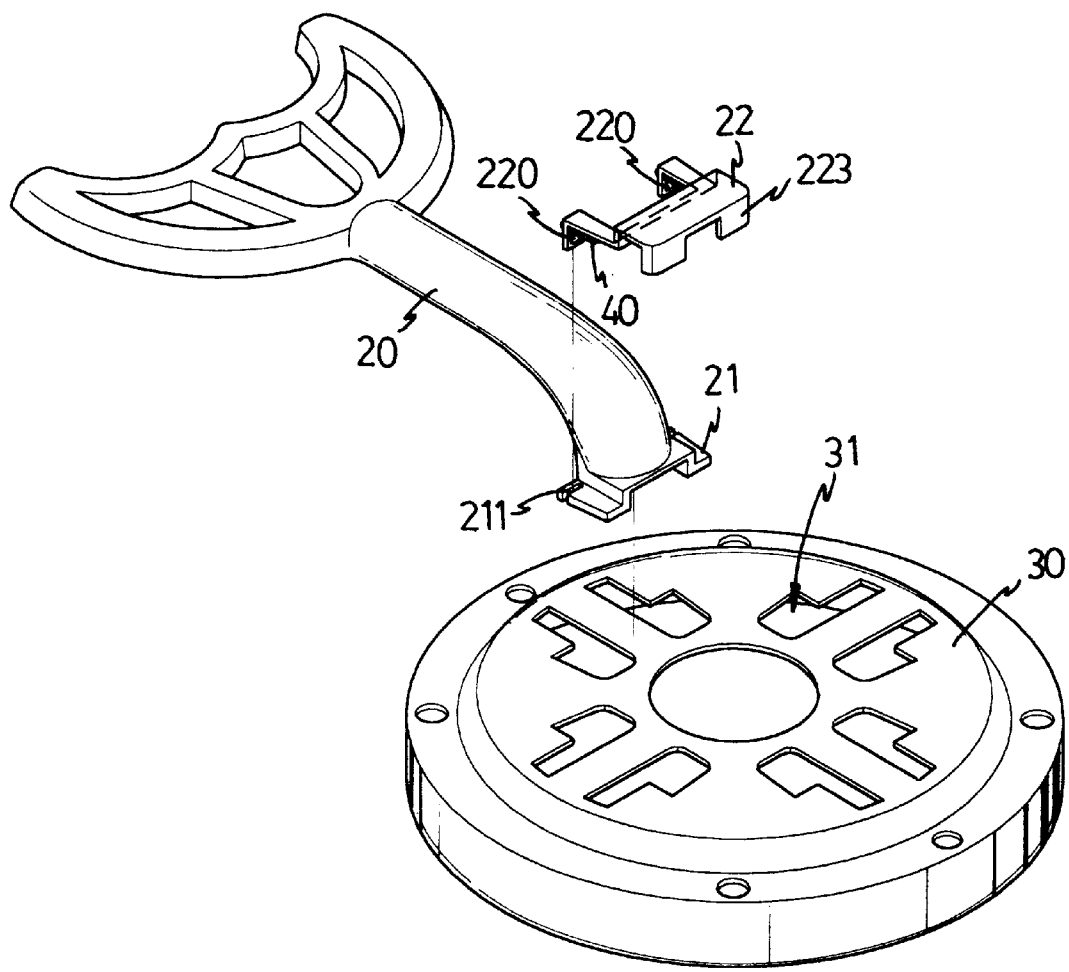
FIG. 5 is an exploded view to show another embodiment of the ceiling fan bracket and the motor casing in accordance with the present invention.
Figure 6:
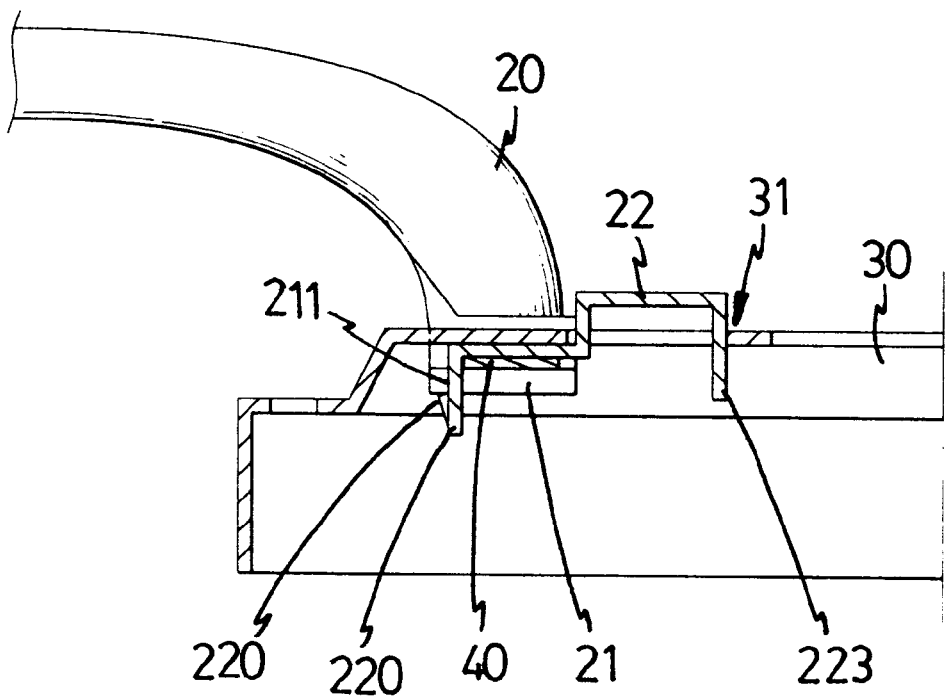
FIG. 6 is a cross-sectional view to show that the two wings of the ceiling fan bracket are pulled away from the center of the motor casing and the two tongues are engaged with the wide portion of the L-shaped holes in the motor casing.

FIGS. 5 and 6 show another embodiment of the present invention wherein each wing 21 has a slot 211 and the connector 22 has two insertions 220, extending therefrom. The two insertions 220 are located on an opposite end of the connector 22 relative to the tongues 223. The two insertions 220 are respectively engaged with the two slots 211.

Figure 7:
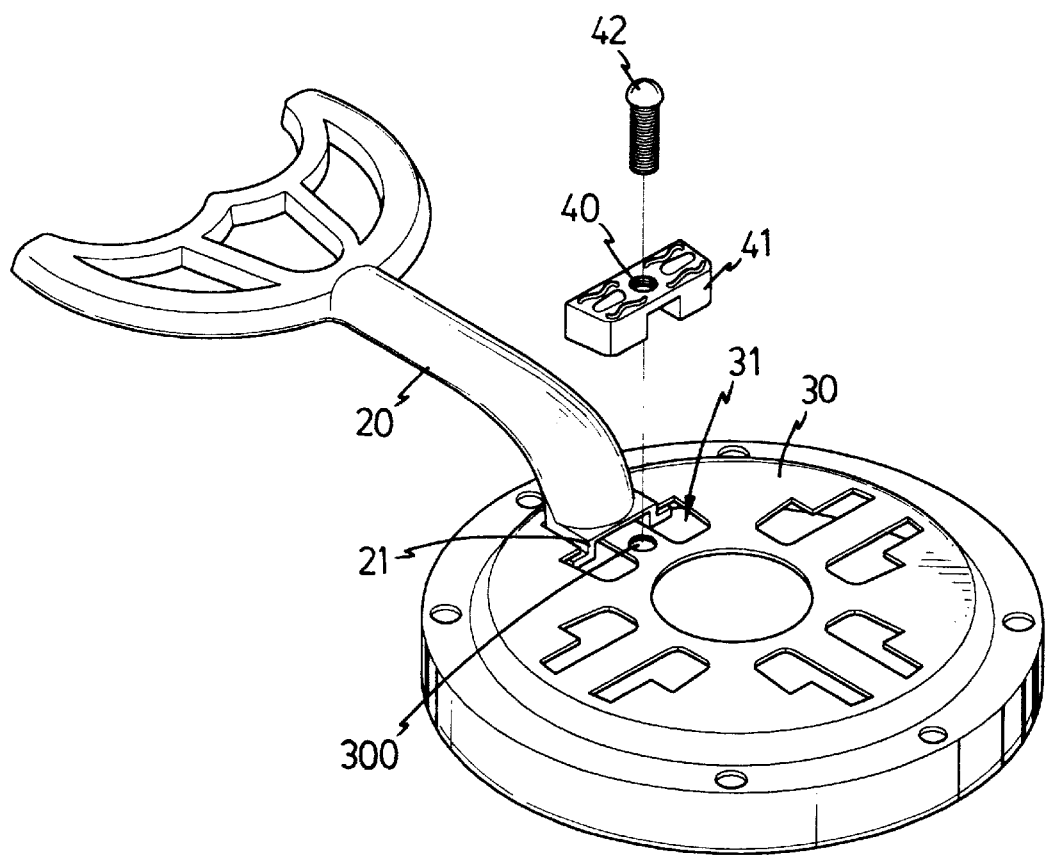
FIG. 7 is an exploded view to show yet another embodiment of the ceiling fan bracket and the motor casing in accordance with the present invention.

FIG. 7 shows yet another embodiment of the present invention wherein the connector 41 does not directly connect to the second end of the ceiling fan bracket 20 and has a first hole 40 defined therethrough and the motor casing 30 has a second hole 300 defined therethrough. The second hole 300 is located between two adjacent L-shaped holes 31 and a bolt 42 extends through the first hole 40 in the connector 41 and is engaged with the second hole 300 in the motor casing 30. The two wings 21 are retained in the narrow portions of the L-shaped holes 31 and the connector 41 is engaged with the wide portions of the adjacent two L-shaped holes 31 to prevent the two wings 21 from shifting into the wide portions of the L-shaped holes 31.

While we have shown and described various embodiments in accordance with the present invention, it should be clear to those skilled in the art that further embodiments may be made without departing from the scope and spirit of the present invention.

What is claimed is:

1. A combination of a ceiling fan bracket and a motor casing, said ceiling fan bracket having a first end adapted to be connected to a ceiling fan blade, and a second end of said ceiling fan bracket having two L-shaped wings respectively extending therefrom;

a connector connected to said second end of said ceiling fan bracket and having two tongues extending therefrom, and said motor casing having a plurality of L-shaped holes defined therethrough, each L-shaped hole including a wide portion located close to a center of said motor casing and a narrow portion located close to a periphery of said motor casing, each wing engaged with said respective narrow portion of said respective L-shaped hole and each tongue engaged with said respective wide portion of said respective L-shaped hole.

2. The combination as claimed in claim 1 further comprising a cushion pad connected between said second end of said ceiling fan bracket and said connector.

3. The combination as claimed in claim 1, wherein said second end of said ceiling fan bracket has an aperture defined therein and said connector has a protrusion extending therefrom which is inserted into said aperture.

4. The combination as claimed in claim 3, wherein said protrusion has a flexible hook member extending therefrom so that said hook member is engaged with said aperture when said hook member passes through said aperture.

5. The combination as claimed in claim 1, wherein each wing has a slot and two insertions extend from said connector, said two insertions respectively engaged with said two slots.

6. A combination of a ceiling fan bracket and a motor casing, said ceiling fan bracket having a first end adapted to be connected to a ceiling fan blade, and a second end of said ceiling fan bracket having two L-shaped wings respectively extending therefrom;

said motor casing having a plurality of L-shaped holes defined therethrough, each L-shaped hole including a wide portion located close to a center of said motor casing and a narrow portion located close to a periphery of said motor casing, each wing engaged with said respective narrow portion of said respective L-shaped hole, and a connector engaged with said wide portions of two adjacent L-shaped holes.

7. The combination as claimed in claim 6, wherein said connector has a first hole defined therethrough and a second hole is defined through said motor casing, said second hole located between said two adjacent L-shaped holes, a bolt extending through said first hole in said connector and engaged with said second hole in said motor casing.

\* \* \* \* \*